May 26, 1964 R. W. SEXTON 3,134,825
GAS TREATING DEVICE AND SYSTEM
Filed July 3, 1961 2 Sheets-Sheet 1

INVENTOR.
ROBERT W. SEXTON
BY
Ralph B. Brick
ATTORNEY

May 26, 1964  R. W. SEXTON  3,134,825
GAS TREATING DEVICE AND SYSTEM
Filed July 3, 1961  2 Sheets-Sheet 2

INVENTOR.
ROBERT W. SEXTON
BY
*Ralph B. Brick*
ATTORNEY

United States Patent Office 3,134,825
Patented May 26, 1964

3,134,825
GAS TREATING DEVICE AND SYSTEM
Robert W. Sexton, Louisville, Ky., assignor to American Air Filter Company, Inc., Louisville, Ky., a corporation of Delaware
Filed July 3, 1961, Ser. No. 121,558
2 Claims. (Cl. 261—16)

The present invention relates to a gas treating device and system and more particularly to an improved gas treating device of the liquid bath type and an improved system in which such device can be utilized for supplying clean gas to the intake manifold of an internal combustion engine.

In accordance with the present invention, an economical and efficiently operated gas treating device and system is presented, such device and system lending itself to easy maintenance and ready incorporation into already existing systems. In addition, the present invention avoids previously known complex and resistance forming liquid distribution apparatus by providing an arrangement which utilizes an available pressure source for liquid distribution and which effectively entrains and distributes portions of the liquid initially introduced into the system.

Various other features of the present invention will become obvious to one skilled in the art upon reading the disclosure set forth hereinafter.

More particularly the present invention provides in a system for supplying clean gas to the intake manifold of an internal combustion engine; a gas cleaner having a liquid bath gas treating device and having dirty gas inlet means and clean gas outlet means; duct means connecting the clean gas outlet means of the gas cleaner with the intake manifold of the engine; supercharger means co-operating with the duct means intermediate the clean gas outlet means of the gas cleaner and the intake manifold of the engine; a liquid supply means in the liquid bath gas treating device for supplying liquid to the gas cleaner and a liquid distribution means for introducing liquid into the cleaner in the form of droplets; and, gas conduit means having one extremity connected downstream of the supercharger and the other extremity connected to the liquid distribution means to supply pressure thereto for liquid distribution purposes. Further, the present invention provides a unique arrangement for insuring a positive pressure to the liquid distribution means, as well as a unique arrangement for insuring efficient entrainment and utilization of liquid initially introduced into the gas cleaner by the aforementioned liquid bath gas treating device.

It is to be understood that various changes can be made by one skilled in the art in the arrangement, form and construction of the apparatus herein disclosed without departing from the scope or spirit of the present invention.

Referring to the drawings which disclose one advantageous embodiment of the inventive gas treating device and system:

Figure 1:
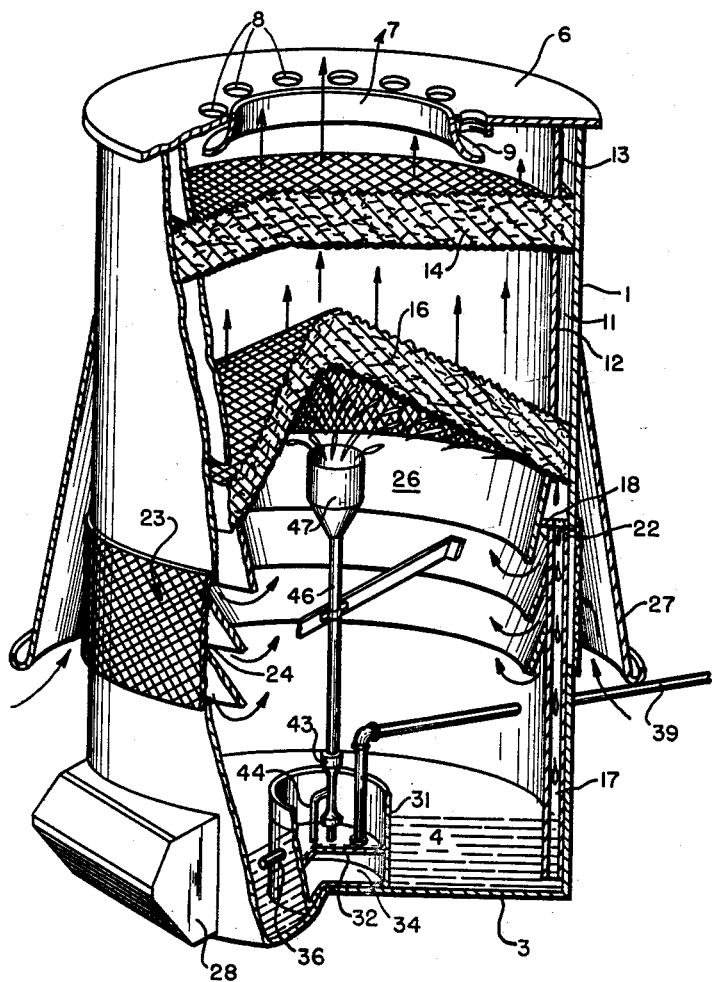
FIGURE 1 is a partially broken away operational perspective view of the liquid bath gas treating device incorporated as part of gas cleaning structure.
Figure 2:
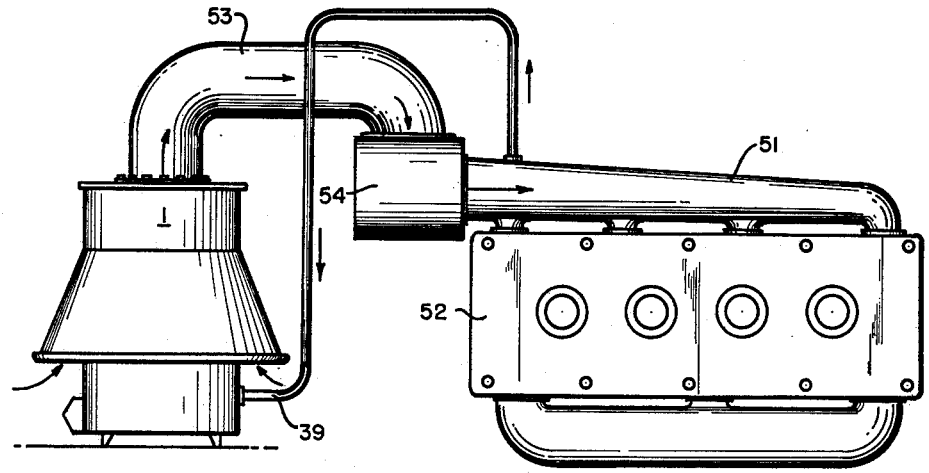
FIGURE 2 is a semi-schematic view of the gas cleaning structure of FIGURE 1 included as part of a novel system for cleaning gas to be introduced into the inlet manifold of an internal combustion engine.

Referring to FIGURE 1 of the drawings, the gas cleaner illustrated includes an outer vertically disposed cylindrical shell or housing 1. Housing 1 is provided at one extremity with bottom end plate 3, this end plate also serving as the base of liquid sump 4. At the other extremity of housing 1, top end plate 6 is provided, such top end plate having clean gas outlet 7 peripherally surrounded by a plurality of spaced apertures 8. Apertures 8 accommodate bolts (not shown) which are utilized to fasten duct 53 hereinafter described (FIGURE 2). Advantageously, an annular bell-shaped ring 9 can be employed at outlet 7 to reduce pipe entrance loss.

Co-axially disposed in the upper portion of housing 1 in spaced relationship from the inner face of the housing to define annular channel 11 is inner cylinder 12. Channel 11 serves as a drain channel for a horizontally extending flat mist eliminator pad 14 which extends radially outward above such channel. An inner cylinder 13 having suitable radially extending spacer arms (not shown) to space the cylinder from the inner face of housing 1 rests on the upper face of pad 14 to maintain it in place. Positioned in spaced relationship below pad 14 so that the edges thereof extend below drain channel 11 is conically shaped gas filter pad 16. It is to be understood that pads 14 and 16 can be made from any one of several well known and suitable filter medium materials and, advantageously, a filter medium material of crimped wire can be used. With the arrangement described, pad 14 can drain through channel 11 to the edge of pad 16. To provide for drainage from the pad 16 edge to sump 14, a vertically extending conduit 17 is utilized. Conduit 17 is positioned below an annular seal plate 18 which extends horizontally between the inner face of housing 1 and the uppermost baffle of a set of spaced annular baffles 26 (further described hereinafter), the conduit 17 communicating with drain channel 11 by virtue of an aperture 22 in the seal plate.

Housing 1 is provided with a suitable peripheral gas inlet 23 below the filter pad 14. Gas inlet 23, as is known in the art is provided with a filter screen 24 which extends across the face thereof to prevent entrance of large contaminant particles into the housing. Positioned adjacent gas inlet 23 in housing 1 are a plurality of spaced annular baffles 26, the uppermost baffle engaging against the seal plate 18 as aforedescribed. A weather seal in the form of an annular apron 27 surrounds gas inlet 23 as is also well known in the art. At the lower portion of housing 1 a suitable sump access unit 28 is provided for access to the sump 4 in order to permit appropriate adjustments and for removal of contaminants that collect at the bottom of the sump. It is to be understood that the apparatus described so far is conventional in the art and does not constitute, in itself, an essential part of the present invention. Other forms of gas cleaning apparatus can be used with the inventive apparatus hereinafter described.

Figure 3:
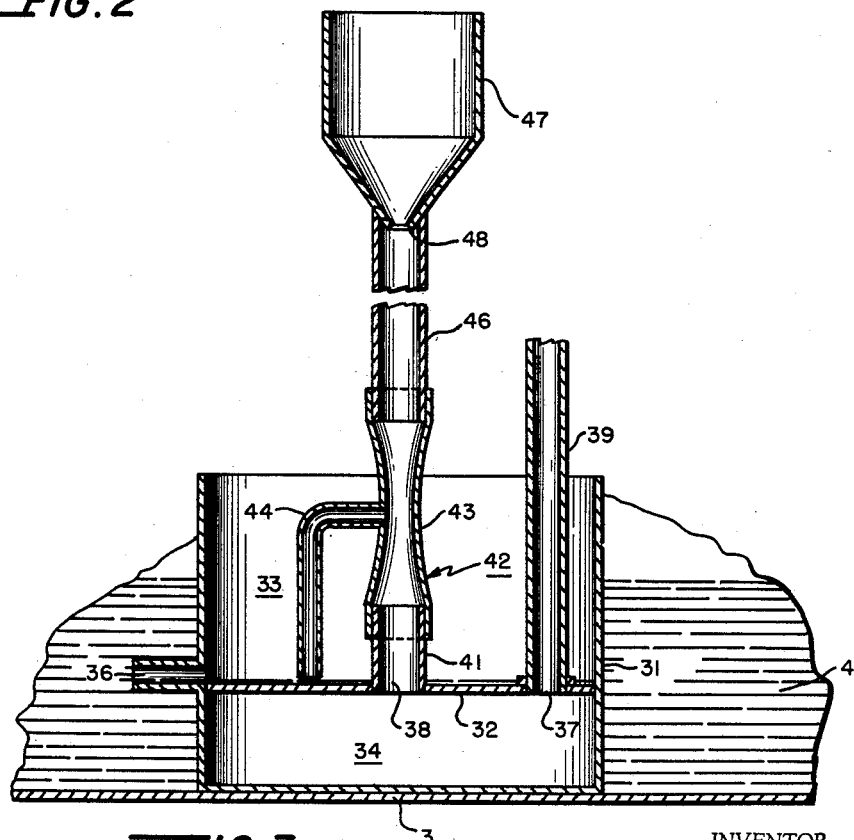
FIGURE 3 is an enlarged cross-sectional view of the liquid bath gas treating device of FIGURE 1.

Referring particularly to FIGURE 3 of the drawings, it can be seen that disposed within liquid sump 4 is a cup 31. Extending horizontally across cup 31 in spaced relationship from the bottom thereof is a dividing plate 32, the plate 32 serving to divide cup 31 into an upper chamber 33 which serves as a liquid reservoir and a lower chamber 34 which serves as a gas pressure chamber. A suitable metering pipe 36 having an orifice of preselected size (as is known in the art) connects reservoir 31 with sump 4 to control the amount of liquid allowed to flow into reservoir 33. It is to be noted that plate 32 is provided with two spaced openings 37 and 38. Opening 37 serves as an inlet to gas pressure chamber 34 which receives gas under pressure from conduit 39 that is connected at one extremity to such opening. Opening 38 serves as a gas pressure outlet for chamber 34 and has a nipple 41 connected thereto. Fastened to nipple 41 is an aspirator assembly 42. Assembly 42 includes a venturi-type sleeve 43 and a right angle vacuum conduit 44. One end of conduit 44 communicates with sleeve 43 at the throat thereof, the other end of conduit 44 extends downwardly to a point slightly above the base of liquid reservoir 33.

Connected at one of its ends to sleeve 43 to extend vertically upward therefrom is a liquid distribution conduit 46. As can be seen in FIGURE 1 of the drawings, conduit 46 extends high enough in housing 1 so that liquid droplets carried thereby can be ejected therefrom to reach the conical pad 16 with a spread of liquid effective over as large a portion of the pad area as possible. To facilitate delivery of droplets to the pad face and to prevent the liquid from streaming down the outside of the conduit 46, a funnel 47 is placed at the top of conduit 46. By making funnel apex 48 of slightly smaller diameter than the diameter of conduit 46, it is possible to re-entrain liquid picked up by the funnel into the gas stream along the central axis of conduit 46 so that efficient distribution can be made of this liquid. Without such an arrangement of the smaller orifice 48, liquid picked up by funnel 47 would have a tendency to adhere to the sides of the funnel and to the inner face of conduit 46 and a large amount of energy would be required to remove such liquid back into the gas stream.

Referring to FIGURE 2 of the drawings, housing 1 of the gas cleaning apparatus aforedescribed including the liquid bath gas treating device is disclosed as part of a system for cleaning air furnished to the intake manifold 51 of an internal combustion engine 52. To conduct the clean air from clean gas outlet 7 of housing 1 to intake manifold 51, a duct 53 of suitable cross sectional area to handle an adequate volume of clean air is provided, this duct having disposed therein upstream of the intake manifold 51 a supercharger 54. Connected downstream of supercharger 54 is the other end of aforementioned conduit 39. This arrangement permits the gas chamber 34 to be maintained under suitable pressure by means of supercharger 54 which leads to the intake manifold 51.

In a typical operation of the apparatus disclosed atmospheric air passes through gas inlet 23 of the housing 1 of the air cleaning apparatus and down along baffles 26 to be subsequently passed upward through conical filter pad 16, flat filter pad 14, through clean gas outlet 7, through duct 53, supercharger 54 and into intake manifold 51. Since intake manifold 51 is operating under pressure created by supercharger 54 and the intake manifold is connected to gas chamber 34 of cup 31 a gas pressure is created in the chamber and in venturi 43. As a result, the velocity pressure of the gas is increased at the throat of the venturi 43 and the static pressure is reduced causing liquid—which advantageously can be a suitable oil—to be aspirated from reservoir 33 of cup 31 into the gas stream. The gas with the entrained liquid rises in the vertically extending liquid distributing column 46 and is distributed in liquid droplets to the conical pad 16. Although funnel 47 is positioned in such a manner that a maximum amount of the liquid droplets reach the pad 16, it is inevitable that some of these droplets will fall back into the funnel. These droplets flow down the sides of the funnel toward the apex where they re-enter into the gas stream along the central longitudinal axis of conduit 46 rather than along the sides of such conduit.

The invention claimed is:
1. A liquid bath gas treating device comprising:
  (a) a vertical housing having a dirty gas inlet disposed in the lower portion thereof and a clean gas outlet disposed in the upper portion thereof in spaced relation from said dirty gas inlet to provide a confined gas flow path for a gaseous stream to be treated; means to supply a dirty gas stream to be treated to said dirty gas inlet;
  (b) gas pervious filter means disposed within said housing intermediate said dirty gas inlet and said clean gas outlet and extending transverse said confined gas flow path;
  (c) a liquid sump containing a supply of liquid positioned in spaced relation below said filter means and said dirty gas inlet in the lower portion of said housing;
  (d) a vertically extending liquid distribution conduit positioned below said filter means with its upper end in spaced relationship therefrom;
  (e) means for conducting liquid from said sump to the lower portion of said liquid distribution conduit;
  (f) means to supply a source of gas at such lower portion to cause said liquid to rise in said liquid distribution conduit and be distributed from its upper end in liquid droplets to said filter means; and
  (g) a diffusing and re-entrainment funnel attached to said upper end of said liquid distribution conduit extending upward and outward therefrom to open in spaced, uninterrupted communication with said filter means to distribute liquid droplets to said filter means in a substantially uniform manner;
  (h) said funnel having an upstream apex opening of smaller diameter than said liquid distribution conduit to extend inwardly therein in communicative alignment with the central longitudinal axis of flow through said liquid distribution conduit whereby any liquid deposited on the inner face of said funnel gravity flows to re-enter into the gas stream substantially along the central longitudinal axis of flow in said conduit to be promptly recirculated to said filter means.

2. A liquid bath gas treating device comprising:
  (a) a vertical housing having a dirty gas inlet disposed in the lower portion thereof and a clean gas outlet disposed in the upper portion thereof in spaced relation from said dirty gas inlet to provide a confined gas flow path for a gaseous stream to be treated; means to supply a dirty gas stream to be treated to said dirty gas inlet;
  (b) gravity draining gas pervious filter means transversely disposed across said housing intermediate said dirty gas inlet and said clean gas outlet to extend across said confined gas flow path;
  (c) a liquid sump containing a supply of liquid positioned in spaced relation below said filter means and said dirty gas inlet in the lower portion of said housing;
  (d) a gas chamber means disposed in said sump including sealing means to maintain said gas chamber means in sealed relationship therefrom;
  (e) a liquid distribution conduit vertically disposed along the central axis of said housing with the lower end in communication with said gas chamber means and its upper end in spaced relation below said filter means;
  (f) aspirating conduit means connecting said sump to the lower portion of said liquid distribution conduit;
  (g) means to supply gas pressure to said gas pressure chamber to cause liquid to pass through said aspirating conduit means and said liquid distribution conduit to be distributed from the upper end of said distribution conduit in droplet form to said filter means; and
  (h) an inverted cone-type funnel attached to said upper end of said liquid distribution conduit and positioned below said filter means in spaced relationship therefrom and in uninterrupted communication therewith, said funnel having its larger base end extending above and outwardly of the upper end of said liquid distribution conduit and having its apex opening of smaller diameter than said liquid distribution conduit to extend inwardly therein communicating with the upper end of said conduit adjacent its central longitudinal axis, whereby liquid deposited on the inner face of said funnel gravity flows to re-enter into the gas stream substantially along the central longitudinal axis of flow in said conduit to be promptly circulated to said filter means.

References Cited in the file of this patent

UNITED STATES PATENTS

| | | |
|---|---|---|
| 678,194 | Pickles | July 9, 1901 |
| 1,781,742 | Anglemeyer | Nov. 18, 1930 |
| 2,290,610 | Goudard | July 21, 1942 |
| 2,309,838 | Fitch et al. | Feb. 2, 1943 |
| 2,887,181 | Dillon | Sept. 18, 1956 |
| 2,889,004 | Nutting et al. | June 2, 1959 |
| 2,966,958 | Sexton | Jan. 3, 1961 |

FOREIGN PATENTS

| | | |
|---|---|---|
| 2,528/26 | Australia | Feb. 9, 1927 |
| 136,682 | Australia | Mar. 14, 1950 |